(No Model.) 2 Sheets—Sheet 2.
E. J. BARBIER.
PROCESS OF AND APPARATUS FOR MAKING SULFURIC ACID.
No. 535,882. Patented Mar. 19, 1895.
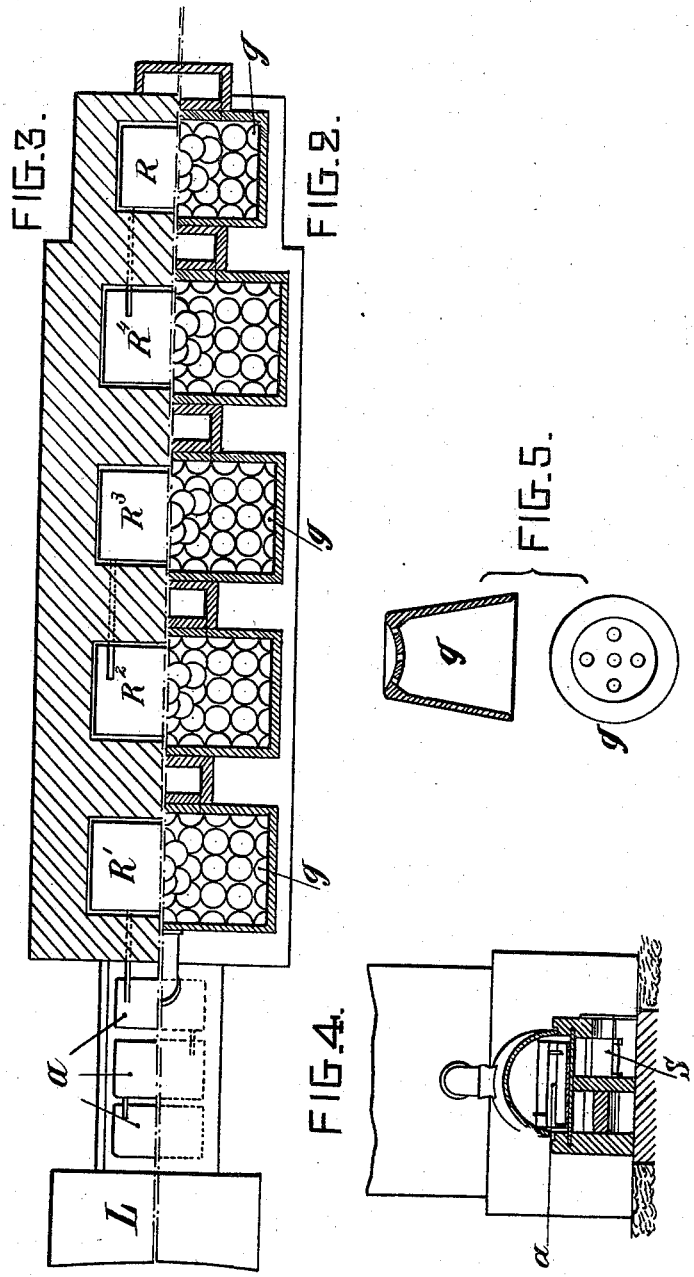

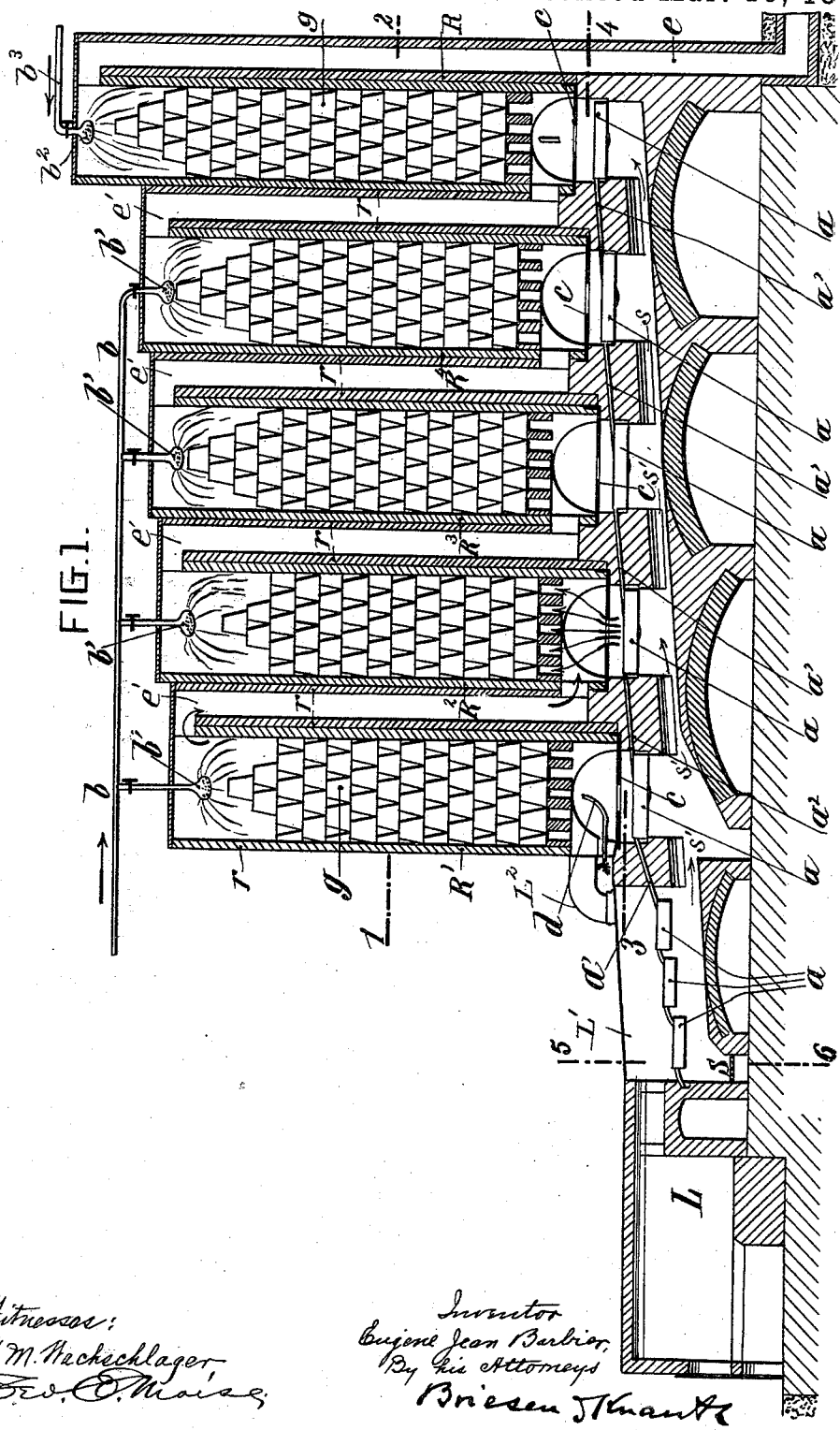

UNITED STATES PATENT OFFICE.

EUGÈNE JEAN BARBIER, OF PARIS, FRANCE.

PROCESS OF AND APPARATUS FOR MAKING SULFURIC ACID.

SPECIFICATION forming part of Letters Patent No. 535,882, dated March 19, 1895.

Application filed June 3, 1893. Serial No. 476,424. (No model.) Patented in France December 4, 1891, No. 217,844; in Italy June 30, 1892, LXII, 498; in Belgium July 6, 1892, No. 100,396, and in England July 11, 1892, No. 12,726.

*To all whom it may concern:*

Be it known that I, EUGÈNE JEAN BARBIER, of the city of Paris, France, have invented an Improved Process and Apparatus for the Economical Production of Sulfuric Acid, (for which I have obtained Letters Patent in France for fifteen years, dated December 4, 1891, No. 217,844; in Belgium for fifteen years, dated July 6, 1892, No. 100,396; in England for fourteen years, dated July 11, 1892, No. 12,726, and in Italy for fifteen years, dated June 30, 1892, Vol. LXII, No. 498,) of which the following is a full, clear, and exact description.

My invention relates to an improved process and apparatus for the economical production of sulfuric acid without using the usual spacious and expensive lead chambers, and consists in the process and apparatus hereinafter set forth and claimed.

My invention will be understood from the accompanying drawings, wherein—

Figure 1 represents a vertical longitudinal section of the entire apparatus. Fig. 2 is a horizontal section of half of the apparatus on line 1—2 of Fig. 1; Fig. 3 is a horizontal section of half of the apparatus on line 3—4 of Fig. 1, and is taken over the pans. Fig. 4 is a section on line 5—6 of Fig. 1, showing the arrangement of the last pans; and Fig. 5 shows on an enlarged scale a sectional and a plan view of one of the perforated pots used in the towers, as will be more fully hereinafter described.

In the drawings, L is a kiln in which the sulfur or pyrites is burned. This kiln communicates by a chamber L' and flue $L^2$ with the first tower R' of a series of communicating reaction towers R', $R^2$, $R^3$, $R^4$ and R. These towers are placed adjacent to one another and a flue $e'$ leads from one tower to another, preferably as shown, from the top of one tower to the bottom of the next adjacent tower. Leading from the tower R is a flue or chimney $e$ which serves to draw the air and gases through the apparatus. Arranged beneath each tower is a pan or other collecting vessel $a$ which collects the acid from each tower. These pans are arranged one above the other in cascade as shown and are connected one to the other by drain pipes $a'$. One or more pans $a$ may also be arranged within the chamber L' and under the last of the cascade a fire is built in the grate S, the gases of which pass off through a flue S' S' passing under the pans $a$. The towers are lined with acid-resisting material $r$ and are partially filled with tiers of perforated pots $g$ (see Fig. 5) of any usual or desired construction. At the bottom of each tower is a perforated bottom $c$ which prevents the acid from falling into the pans $a$ with too great a shock. Suitable jets or sprinklers $b'$ $b'$ are arranged in the tops of the towers and are fed with dilute nitric acid, or sulfo nitric acid so called, by means of a pipe $b$ communicating with a source of supply such as an elevated tank (not shown). The last tower R of the cascade is a Gay-Lussac or absorption tower, and is supplied with acid by means of the pipe $b^3$ and sprayer $b^2$.

The operation of my apparatus is as follows: At the start of the operation a fire is lighted in the grate S and the pans are filled with ordinary sulfuric acid at 50° to 52° Baumé. Sulfur or pyrites is burned (say about three hundred kilograms of sulfur or seven hundred kilograms of pyrites) in the kiln L, the admission of air being regulated at will by the air entry register of the kiln. From the kiln the sulfurous gases pass into the chamber L' over the pans $a$ $a$ therein and into the tower R'. The gases enter at the bottom of the reaction tower R' and rising come in contact with the falling nitric acid and the rising nitrous and aqueous vapors produced by the evaporation of the liquids in the pan $a$ under the tower, and sulfuric acid is formed, according to the usual reaction, which acid gathers in the pan $a$, where it is heated by the gases from the fire at S, and the aqueous and nitrous vapors are disengaged and rise in the tower as before stated. The excess of sulfurous gases passes over into the next adjacent tower, where the operation is repeated and so on through the series until it comes to the last tower R, where such of the sulfurous gases as have not been oxidized are absorbed by the descending stream of acid. The sulfuric acid formed in the apparatus flows from pan to pan of the cascade, and becomes more and more concentrated as it flows, on account of evaporation of aqueous and nitrous vapors therefrom, due to the heating of the pans by the fire at S and the evaporating action of the hot gases which pass over the pans, and when it reaches the last pan $a$ it shows a concentration of 58° to 60° Baumé. The reactions may be facilitated by the introduction of steam, air or nitrous vapors at any suitable part of the apparatus, should it be found desirable, but such operations will ordinarily only be necessary at the starting up of the process to accelerate the same.

I have found that it will be necessary to supply about one kilogram of nitric or sulfonitric acid for every one hundred kilograms of sulfur burned, but it will be readily understood that should nitric acid not be available, it may be produced by the decomposition of nitrate of soda by the hot gases of the kilns.

What I claim as new, and desire to secure by Letters Patent, is—

1. The herein described process of producing concentrated sulfuric acid, which consists in causing the vapor of sulfurous acid from burning brimstone or pyrites to circulate through a series of reaction towers in succession, subjecting such vapors to the action of a divided stream of sulfonitric acid or diluted nitric acid in the upper part of such reaction towers and to the action of nitrous and aqueous vapors in the lower part of such towers, substantially as described.

2. In and for the manufacture of sulfuric acid, a series of towers communicating one with another, a series of collecting troughs or evaporating basins, each placed beneath one of the series of towers and disposed in cascade, conduits connecting the troughs in series, a furnace under one of the basins and flues under one or more of the remaining basins, said basins acting as receivers for the sulfuric acid produced in the towers as concentrators for the same sulphuric acid and as generators for nitrous and aqueous vapors suitable for the reaction in the towers, substantially as described.

The foregoing specification of my improved process and apparatus for the economical production of sulphuric acid signed by me this 13th day of May, 1893.

EUGÈNE JEAN BARBIER.

Witnesses:
ROBT. M. HOOPER,
ALBERT MOREAU.